(12) United States Patent
Huang et al.

(10) Patent No.: US 8,017,884 B2
(45) Date of Patent: Sep. 13, 2011

(54) INTEGRATED TOUCH PANEL AND ELECTRONIC DEVICE USING THE SAME

(75) Inventors: Ping-Wen Huang, Taichung (TW); Hsien-Hsing Wu, Taichung (TW); Chiung-Chuang Chen, Changhua County (TW)

(73) Assignee: Wintek Corporation, Taichung (TW)

( * ) Notice: Subject to any disclaimer, the term of this patent is extended or adjusted under 35 U.S.C. 154(b) by 313 days.

(21) Appl. No.: 12/486,829

(22) Filed: Jun. 18, 2009

(65) Prior Publication Data

US 2009/0321240 A1 Dec. 31, 2009

Related U.S. Application Data

(60) Provisional application No. 61/076,244, filed on Jun. 27, 2008.

(51) Int. Cl.
*H03K 17/975* (2006.01)
(52) U.S. Cl. .................. 200/600; 178/18.05; 345/173
(58) Field of Classification Search .................. 200/600; 178/18.01–18.08; 345/173
See application file for complete search history.

(56) References Cited

U.S. PATENT DOCUMENTS

| | | | | |
|---|---|---|---|---|
| 4,228,330 A * | 10/1980 | Larson | | 200/600 |
| 4,894,493 A * | 1/1990 | Smith et al. | | 200/600 |
| 6,215,476 B1 * | 4/2001 | Depew et al. | | 345/173 |
| 7,274,353 B2 * | 9/2007 | Chiu et al. | | 345/173 |
| 7,307,231 B2 * | 12/2007 | Matsumoto et al. | | 200/512 |
| 7,355,592 B2 * | 4/2008 | Hong et al. | | 345/173 |
| 7,538,287 B2 * | 5/2009 | Fujii et al. | | 200/512 |
| 2003/0011576 A1 * | 1/2003 | Sandbach et al. | | 345/173 |
| 2005/0030294 A1 * | 2/2005 | Ahn et al. | | 345/173 |
| 2008/0257706 A1 * | 10/2008 | Haag | | 200/600 |
| 2009/0101489 A1 * | 4/2009 | Lee | | 200/600 |
| 2010/0078231 A1 * | 4/2010 | Yeh et al. | | 178/18.05 |

* cited by examiner

*Primary Examiner* — Briggitte R Hammond
(74) *Attorney, Agent, or Firm* — Thomas|Kayden

(57) ABSTRACT

An integrated touch panel including a first, second, and third substrates, a first and second adhesive layers, a first and second axial conductive layers, a shielding layer, a first and second conductive films, two first and second conductive electrodes is provided. The first axial conductive layer, the first adhesive layer and the second axial conductive layer are laminated in order between the first substrate and the second substrate. The shielding layer and the first conductive film are adjacent to each other and disposed between the second substrate and the third substrate. The second adhesive layer and the second conductive film are laminated in order between the first conductive film and the third substrate. Two first conductive electrodes are disposed in parallel between the first conductive film and the second adhesive layer, and two second conductive electrodes are disposed in parallel between the first conductive film and the second adhesive layer.

20 Claims, 4 Drawing Sheets

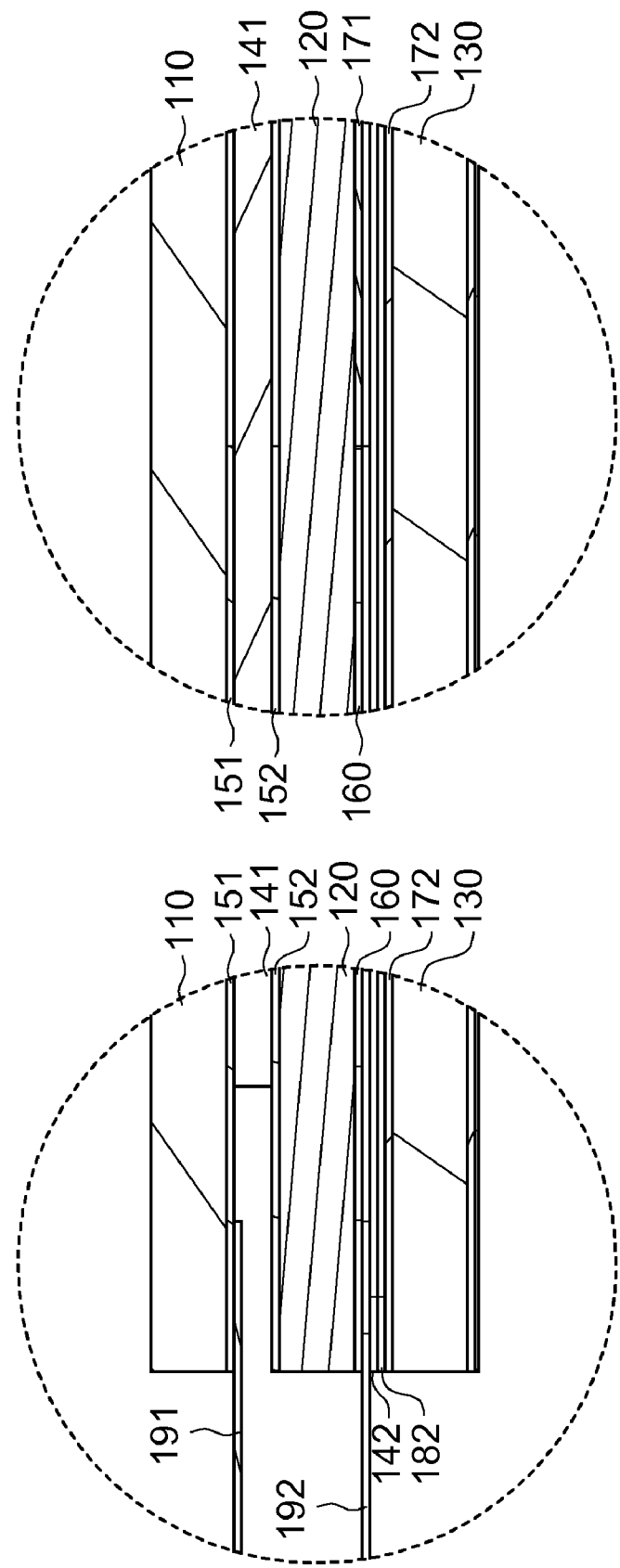

INTEGRATED TOUCH PANEL AND ELECTRONIC DEVICE USING THE SAME

This application claims the benefit of U.S. application Ser. No. 61/076,244, filed Jun. 27, 2008, the subject matter of which is incorporated herein by reference.

BACKGROUND OF THE INVENTION

1. Field of the Invention

The invention relates in general to a touch panel, and more particularly to an integrated capacitive and resistive touch panel.

2. Description of the Related Art

The touch panels available in the market can be divided into capacitive type, resistive type, ultra-sonic type, ultra-red type and electromagnetic type touch panels, and each type of touch panel has its own advantages and disadvantages. Take the capacitive touch panel for example. Its structure for multi-point touch is simple and is suitable for mass production. However, the capacitive touch panel has poor accuracy in sensing the touch by finger, such that the capacitive touch panel is normally cooperated with a stylus. The resistive touch panel, which lacks the function of multi-point touch, is as well poor in sensitivity. Therefore, how to provide a touch panel which best meets market demands in terms of cost, efficiency, and operating convenience has become a focus to manufacturers.

SUMMARY OF THE INVENTION

The invention is directed to an integrated touch panel which integrates the functions and features of capacitive touch panel and resistive touch panel, and makes the product even more competitive in the market.

According to a first aspect of the present invention, an integrated touch panel is provided. The integrated touch panel includes a first substrate, a second substrate, a third substrate, a first adhesive layer, a second adhesive layer, a first axial conductive layer, a second axial conductive layer, a shielding layer, a first conductive film, a second conductive film, two first conductive electrodes and two second conductive electrodes. The first axial conductive layer, the first adhesive layer and the second axial conductive layer are laminated in order between the first substrate and the second substrate, wherein the first axial conductive layer and the second axial conductive layer correspond to a capacitive touch area of the touch panel. The shielding layer and the first conductive film are adjacent to each other and disposed between the second substrate and the third substrate, wherein the shielding layer corresponds to the capacitive touch area, the first conductive film corresponds to a resistive touch area of the touch panel. The second adhesive layer and the second conductive film are laminated in order between the first conductive film and the third substrate, wherein the second adhesive layer is disposed along at least one edge of the touch panel, and the second conductive film faces the first conductive film. Two first conductive electrodes are disposed in parallel between the first conductive film and the second adhesive layer, two second conductive electrodes are disposed in parallel between the second conductive film and the second adhesive layer, and an extending direction of the first conductive electrodes is perpendicular to that of the second conductive electrodes. The integrated touch panel is disclosed in the embodiments below.

According to a second aspect of the present invention, an electronic device including a display panel and the integrated touch panel disclosed above is provided. The electronic device is disclosed in the embodiments below.

The invention will become apparent from the following detailed description of the preferred but non-limiting embodiments. The following description is made with reference to the accompanying drawings.

BRIEF DESCRIPTION OF THE DRAWINGS

FIG. 2C shows a partial enlargement of the capacitive touch area of FIG. 2B;

FIG. 2D shows a partial enlargement at the juncture between the capacitive and the resistive touch areas of FIG. 2B.

DETAILED DESCRIPTION OF THE INVENTION

Figure 1:
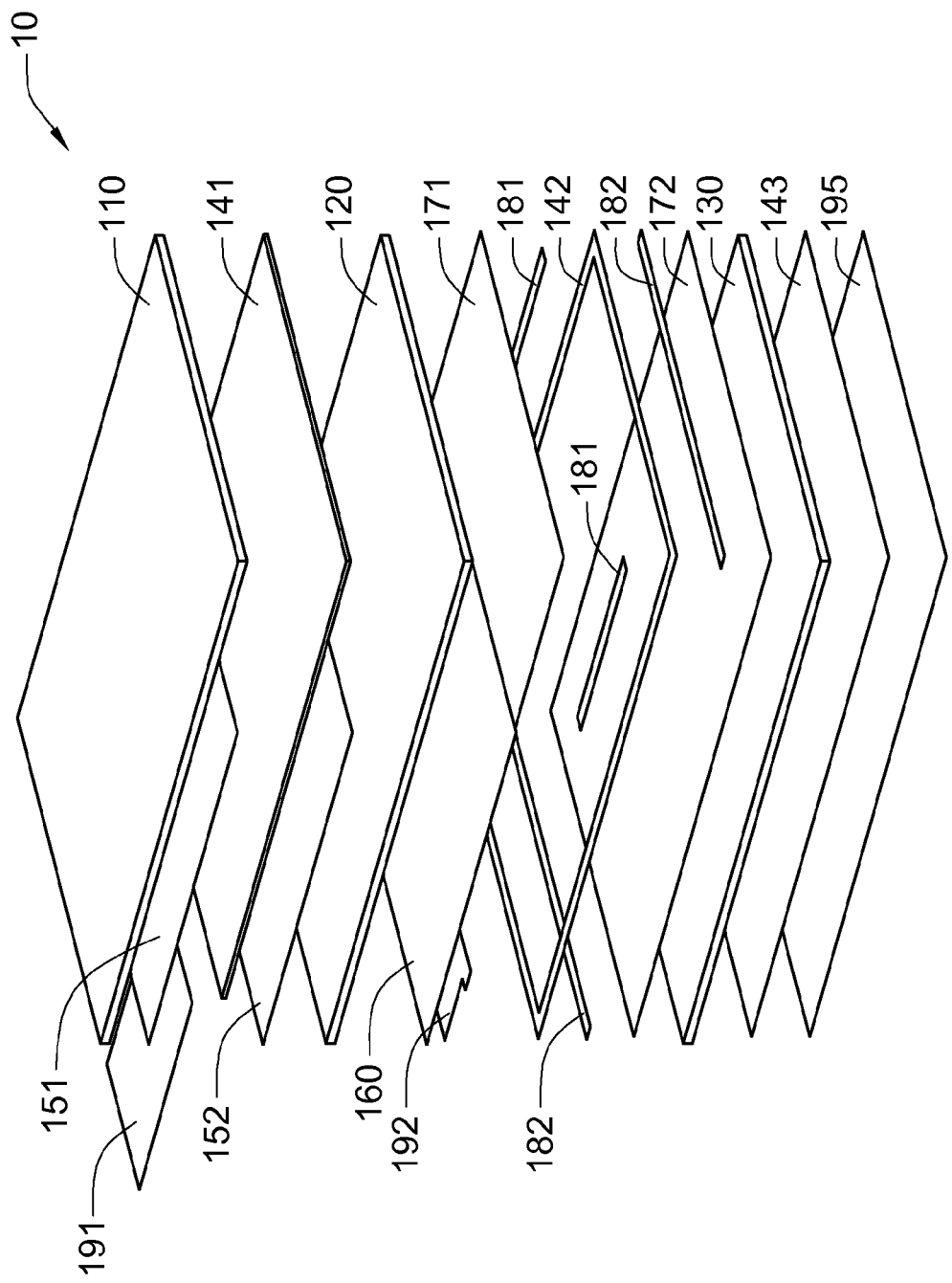
FIG. 1 is an exploded diagram of an integrated touch panel according to a preferred embodiment of the invention.
Figure 2A:
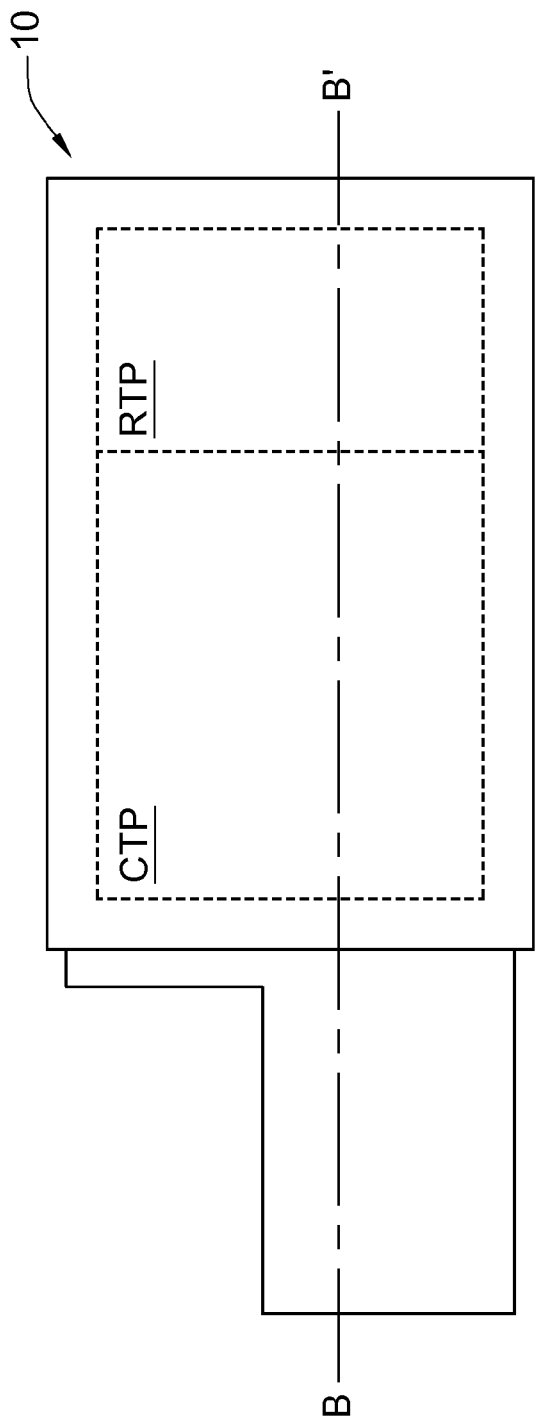
FIG. 2A is a planar diagram of the integrated touch panel in FIG. 1 after assembled.

Referring to FIG. 1 and FIG. 2A, FIG. 1 is an exploded diagram of an integrated touch panel according to a preferred embodiment of the invention, and FIG. 2A is a planar diagram of the integrated touch panel in FIG. 1 after assembled. As shown in FIG. 1, the integrated touch panel 10 includes a first substrate 110, a second substrate 120, a third substrate 130, a first adhesive layer 141, a second adhesive layer 142, a first axial conductive layer 151, a second axial conductive layer 152, a shielding layer 160, a first conductive film 171, a second conductive film 172, two first conductive electrodes 181 and two second conductive electrodes 182. The second substrate 120 is disposed between the first substrate 110 and the third substrate 130. The first axial conductive layer 151 is disposed on the bottom surface of the first substrate 110. The second axial conductive layer 152 is disposed on the top surface of the second substrate 120. The first axial conductive layer 151 and the second axial conductive layer 152 correspond to a capacitive touch area CTP (referring to FIG. 2A) of the touch panel 10. The first adhesive layer 141 is disposed between the first axial conductive layer 151 and the second axial conductive layer 152 for insulating and connecting the first axial conductive layer 151 and the second axial conductive layer 152.

The shielding layer 160 and the first conductive film 171 are adjacent to each other and disposed on the bottom surface of the second substrate 120, wherein the shielding layer 160 corresponds to the capacitive touch area CTP, and the first conductive film 171 corresponds to a resistive touch area RTP (referring to FIG. 2A) of the touch panel 10. The second conductive film 172 is disposed on the top surface of the third substrate 130. The second adhesive layer 142 is disposed along, for example, the four edges of the touch panel 10 and disposed between the first conductive film 171 and the second conductive film 172 for insulating and connecting the first conductive film 171 and the second conductive film 172. The two first conductive electrodes 181 are disposed in parallel between the first conductive film 171 and the second adhesive layer 142. The two second conductive electrodes 182 are disposed in parallel between the second conductive film 172 and the second adhesive layer 142. The extending direction of the first conductive electrodes 181 is perpendicular to that of the second conductive electrodes 182.

As shown in FIG. 2A, the capacitive touch area CTP and the resistive touch area RTP are adjacent to but not overlapped with each other, so that a part of the integrated touch panel 10 has the function of capacitive touch control and the other part of the integrated touch panel 10 has the function of resistive touch control. The areas of the capacitive touch area CTP and the resistive touch area RTP can be the same or different, which renders the structure of the integrated touch panel 10 more flexible, so as to meet the needs of different product design.

The integrated touch panel 10 further includes two signal transmission cables 191 and 192 (shown in FIG. 1), wherein the signal transmission cable 191 is electrically connected to the capacitive touch area CTP for transmitting signals for the control of the capacitive touch area CTP. The signal transmission cable 192 is electrically connected to the resistive touch area RTP to control the resistive touch area RTP. The signal transmission cables 191 and 192 are flexible printed circuit boards for example. Furthermore, the integrated touch panel 10 has a third adhesive layer 143 disposed on the other side of the third substrate 130 opposite to the second conductive film 172 for enhancing the bonding between the touch panel 10 and other components. The third adhesive layer 143 can be made from a pressure sensitivity adhesive (PSA). Besides, a release film 195 can be disposed on the other side of the third adhesive layer 143 opposite to the third substrate 130 to protect the third adhesive layer 143.

Figure 2B:
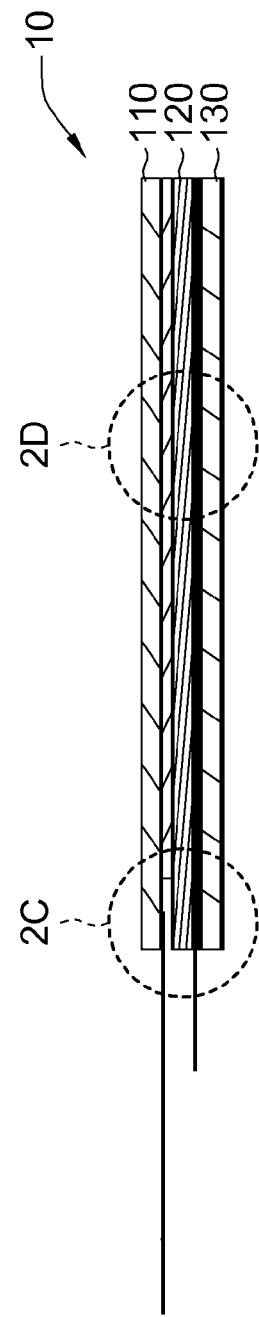
FIG. 2B shows a cross-sectional view of the integrated touch panel in FIG. 2A along the line B-B'.

Referring to FIGS. 2B, 2C and 2D, FIG. 2B shows a cross-sectional view of the integrated touch panel in FIG. 2A along the line B-B', FIG. 2C shows a partial enlargement of the capacitive touch area of FIG. 2B, and FIG. 2D shows a partial enlargement at the juncture between the capacitive and the resistive touch areas of FIG. 2B. After the components in FIG. 1 are assembled, as shown in FIG. 2B, the substrates of the integrated touch panel 10 in a top-down order are the first substrate 110, the second substrate 120 and the third substrate 130 respectively. The three substrates are transparent substrates or flexible films for example and can be made from polyethylene terephthalate (PET) or other flexible transparent materials. As shown in FIG. 2C, the first axial conductive layer 151 is disposed on the bottom surface of the first substrate 110, and the second axial conductive layer 152 is disposed on the top surface of the second substrate 120. The first axial conductive layer 151 and the second axial conductive layer 152 are made from a transparent electrode material such as indium tin oxides (ITO) for example. The first axial conductive layer 151 and the second axial conductive layer 152 each include different electrode patterns that can be formed by coating, exposing, developing, etching and stripping, such that different touch position can be detected through the capacitive change as the panel 10 is touched. The first adhesive layer 141 is used for adhering the first axial conductive layer 151 and the second axial conductive layer 152 and at the same time maintaining suitable interval between the first axial conductive layer 151 and the second axial conductive layer 152. The first adhesive layer 141 can be made from an insulating material or a pressure sensitivity adhesive. The signal transmission cable 191 is electrically connected to the first axial conductive layer 151 for example.

As shown in FIG. 2D, the shielding layer 160 and the first conductive film 171 are adjacent to each other and disposed on the bottom surface of the second substrate 120, wherein the shielding layer 160 corresponds to the first axial conductive layer 151 and the second axial conductive layer 152, and the first conductive film 171 faces the second conductive film 172 which is disposed on the top surface of the third substrate 130. The shielding layer 160 and the first conductive film 171 can be made from a transparent electrode material at the same time, and a gap exists between the shielding layer 160 and the first conductive film 171. Preferably, the gap between the shielding layer 160 and the first conductive film 171 can be formed by way of etching. The shielding layer 160 not only separates the capacitive touch area CTP from the resistive touch area RTP but also avoids external electrical noise being transmitted to the capacitive touch area CTP. The two first conductive electrodes 181 (referring to FIG. 1) are located under the first conductive film 171, and the two second conductive electrodes 182 (referring to FIG. 1 or FIG. 2C) are disposed above the second conductive film 172. The first and the second conductive electrodes 181 and 182 preferably are silver conductive electrodes and can be formed on the first and the second conductive films 171 and 172 by printing. The second adhesive layer 142 (referring to FIG. 1 or FIG. 2C) disposed between the first conductive electrode 181 and the second conductive electrode 182 can be made from an insulating material. The second conductive electrode 182 is electrically connected to the signal transmission cable 192 (referring to FIG. 2C) by, for example, some through holes of the second adhesive layer 142.

Figure 3:
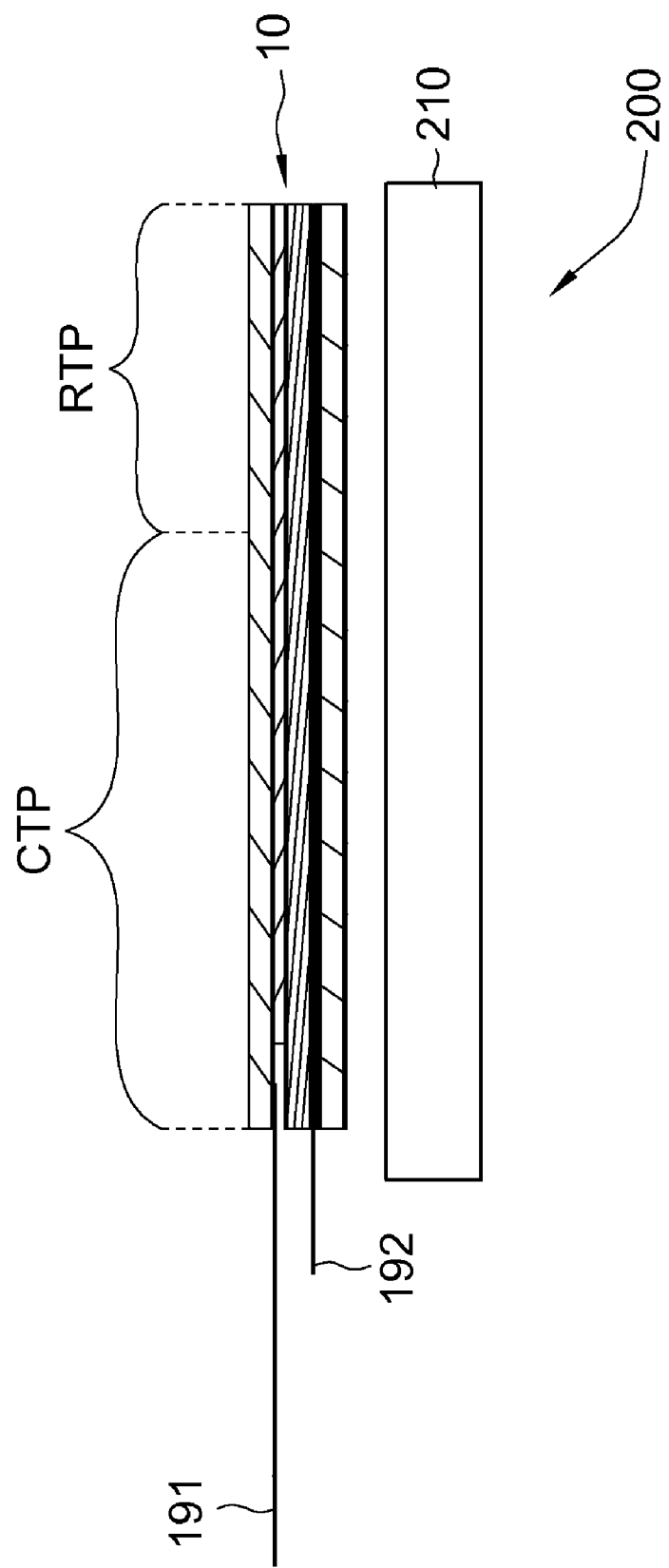
FIG. 3 shows an electronic device according to a preferred embodiment of the invention.

Referring to FIG. 3, an electronic device according to a preferred embodiment of the invention is shown. The integrated touch panel 10 used in an electronic device 200 for example is incorporated with a display panel 210. The integrated touch panel 10 covers the display panel 210, wherein the integrated touch panel 10 and the display panel 210 are electrically connected through the signal transmission cables 191 and 192 and other control circuits (not illustrated). As the touch control area of the integrated touch panel 10 is divided into a capacitive touch area CTP and a resistive touch area RTP, the integrated touch panel 10 possesses both the functions of multi-point touch and hand writing at the same time. The ratio of the capacitive touch area CTP to the resistive touch area RTP can be determined according to functional requirements of the electronic device 200. With the disposition of the capacitive touch area CTP, the resistive touch area RTP and the display frame of the display panel 210, the hand writing area and the display area can be divided, and some area can be reserved for other purposes.

According to the integrated touch panel and the electronic device using the same disclosed in the above embodiments of the invention, capacitive touch control and resistive touch control are integrated in a single touch panel, so that the integrated touch panel has the functions of capacitive and resistive touch control as well as the functions of a conventional touch panel, hence improving product quality and competiveness. As the components for constituting the integrated touch panel of the above embodiments of the invention can be manufactured by existing manufacturing facilities and processes, no extra cost will incur. Thus, the integrated touch panel the above embodiments of the invention of and the electronic device using the same further indeed conform to market needs.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An integrated touch panel with a capacitive touch area and a resistive touch area, wherein the capacitive touch area and the resistive touch area are adjacent to but not overlapped with each other, the integrated touch panel comprising:
- a first substrate, a second substrate and a third substrate, wherein the second substrate is disposed between the first substrate and the third substrate;
- a first axial conductive layer, a first adhesive layer and a second axial conductive layer, which are laminated in order between the first substrate and the second substrate, wherein the first axial conductive layer and the second axial conductive layer correspond to the capacitive touch area;
- a shielding layer and a first conductive film, which are adjacent to each other and disposed between the second substrate and the third substrate, wherein the shielding layer corresponds to the capacitive touch area, and the first conductive film corresponds to the resistive touch area;
- a second adhesive layer and a second conductive film, which are laminated in order between the first conductive film and the third substrate, wherein the second adhesive layer is disposed along at least one edge of the touch panel, and the second conductive film faces the first conductive film;
- two first conductive electrodes disposed in parallel between the first conductive film and the second adhesive layer; and
- two second conductive electrodes disposed in parallel between the second conductive film and the second adhesive layer, wherein an extending direction of the two first conductive electrodes is perpendicular to that of the two second conductive electrodes.

2. The integrated touch panel according to claim 1, wherein the shielding layer and the first conductive film are made from the same material.

3. The integrated touch panel according to claim 1, wherein the first substrate, the second substrate and the third substrate are transparent substrates.

4. The integrated touch panel according to claim 1, wherein the first axial conductive layer, the second axial conductive layer, the first conductive film and the second conductive film are made from a transparent electrode material.

5. The integrated touch panel according to claim 1, wherein the first adhesive layer is made from a pressure sensitivity adhesive.

6. The integrated touch panel according to claim 1, wherein the first adhesive layer and the second adhesive layer are made from an insulating material.

7. The integrated touch panel according to claim 1, wherein the two first conductive electrodes and the two second conductive electrodes are silver conductive electrodes.

8. The integrated touch panel according to claim 1, further comprising a signal transmission cable electrically connected to the capacitive touch area.

9. The integrated touch panel according to claim 1, further comprising a signal transmission cable electrically connected to the resistive touch area.

10. The integrated touch panel according to claim 1, further comprising a third adhesive layer disposed on the other side of the third substrate opposite to the second conductive film.

11. An electronic device, comprising:
- a display panel; and
- an integrated touch panel covering the display panel and having a capacitive touch area and a resistive touch area, wherein the capacitive touch area and the resistive touch area are adjacent to but not overlapped with each other, the integrated touch panel comprises:
  - a first substrate, a second substrate and a third substrate, wherein the second substrate is disposed between the first substrate and the third substrate;
  - a first axial conductive layer, a first adhesive layer and a second axial conductive layer, which are laminated in order between the first substrate and the second substrate, wherein the first axial conductive layer and the second axial conductive layer correspond to the capacitive touch area;
  - a shielding layer and a first conductive film, which are adjacent to each other and disposed between the second substrate and the third substrate, wherein the shielding layer corresponds to the capacitive touch area, and the first conductive film corresponds to the resistive touch area;
  - a second adhesive layer and a second conductive film, which are laminated in order between the first conductive film and the third substrate, wherein the second adhesive layer is disposed along at least one edge of the touch panel, and the second conductive film faces the first conductive film;
  - two first conductive electrodes, which are disposed in parallel between the first conductive film and the second adhesive layer; and
  - two second conductive electrodes, which are disposed in parallel between the second conductive film and the second adhesive layer, wherein an extending direction of the two first conductive electrodes is perpendicular to that of the two second conductive electrodes.

12. The electronic device according to claim 11, wherein the shielding layer and the first conductive film are made from the same material.

13. The electronic device according to claim 11, wherein the first substrate, the second substrate and the third substrate are transparent substrates.

14. The electronic device according to claim 11, wherein the first axial conductive layer, the second axial conductive layer, the first conductive film and the second conductive film are made from a transparent electrode material.

15. The electronic device according to claim 11, wherein the first adhesive layer is made from a pressure sensitivity adhesive.

16. The electronic device according to claim 11, wherein the first adhesive layer and the second adhesive layer are made from an insulating material.

17. The electronic device according to claim 11, wherein the two first conductive electrodes and the two second conductive electrodes are silver conductive electrodes.

18. The electronic device according to claim 11, wherein the integrated touch panel further comprises a signal transmission cable electrically connected to the capacitive touch area.

19. The electronic device according to claim 11, wherein the integrated touch panel further comprises a signal transmission cable electrically connected to the resistive touch area.

20. The electronic device according to claim 11, wherein the integrated touch panel further comprises a third adhesive layer disposed on the other side of the third substrate opposite to the second conductive film.

* * * * *